Figure 1:
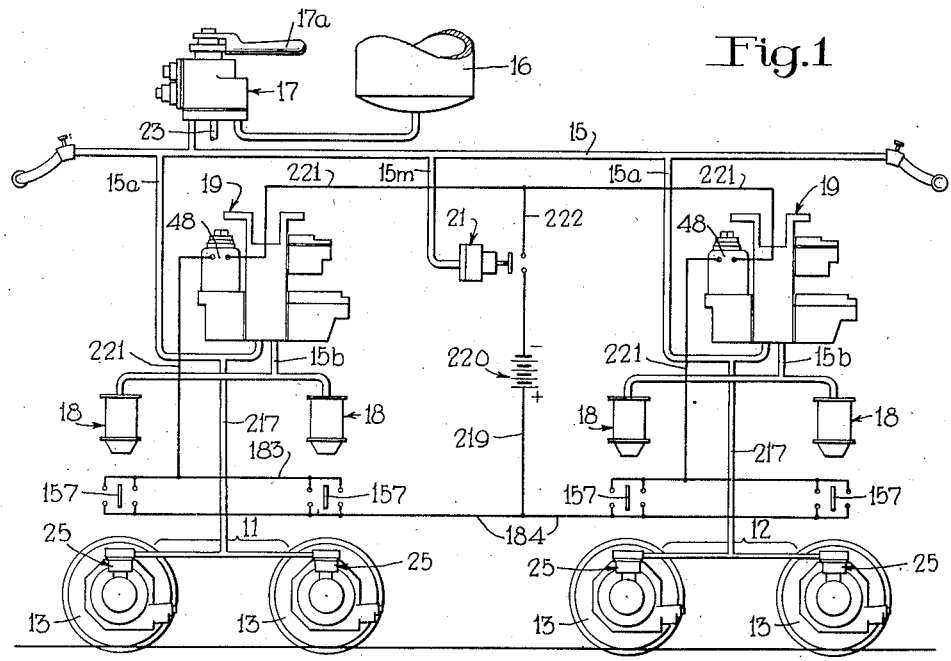

Feb. 3, 1948. J. C. McCUNE ET AL 2,435,319
INERTIA OPERATED CONTROL DEVICE
Filed Nov. 28, 1942 5 Sheets-Sheet 1

INVENTORS
JOSEPH C. McCUNE
GEORGE K. NEWELL
BY
*A L Vencill*
ATTORNEY

Feb. 3, 1948.   J. C. McCUNE ET AL   2,435,319
INERTIA OPERATED CONTROL DEVICE
Filed Nov. 28, 1942   5 Sheets-Sheet 2

INVENTORS
JOSEPH C. McCUNE
GEORGE K. NEWELL
BY
ATTORNEY

Feb. 3, 1948.    J. C. McCUNE ET AL    2,435,319
INERTIA OPERATED CONTROL DEVICE
Filed Nov. 28, 1942    5 Sheets-Sheet 5

INVENTORS
JOSEPH C. McCUNE
GEORGE K. NEWELL
BY
ATTORNEY

Patented Feb. 3, 1948

2,435,319

UNITED STATES PATENT OFFICE 2,435,319

INERTIA OPERATED CONTROL DEVICE

Joseph C. McCune, Edgewood, and George K. Newell, Pitcairn, Pa., assignors to The Westinghouse Air Brake Company, Wilmerding, Pa., a corporation of Pennsylvania Application November 28, 1942, Serial No. 467,236

10 Claims. (Cl. 200—52)

1

This invention relates to inertia operated control devices and has particular relation to control devices of the rotary inertia type responsive according to the rate of rotative deceleration and acceleration of a rotary element, such as a vehicle wheel, and capable of being utilized for a desired indicating or control purpose, such as the control of the brakes associated with vehicle wheels in a manner to prevent the sliding of the wheels due to excessive braking.

Rotary inertia devices have been previously devised and employed for the purpose of detecting the slipping condition of a vehicle wheel on the basis of the abnormal rate of rotative deceleration of the wheels during the slipping condition thereof. Moreover, such devices have been employed in vehicle brake control systems for the purpose of effecting a rapid reduction in the degree of application of the brakes on a wheel, in response to initiation of a slipping condition of the wheel due to braking, to cause the restoration of the wheel to a speed corresponding to car speed before the wheel decelerates sufficiently to attain a locked or sliding condition.

It will be understood that the term "slipping condition," as applied herein to a vehicle wheel, refers to the rotation of the vehicle wheel at a speed different from a speed corresponding to car speed at a given instant; whereas, the term "sliding" or "sliding condition" refers to the locked condition of the vehicle wheel.

Heretofore known types of rotary inertia control devices associated directly with the wheel and axle assembly of railway car trucks for the purpose of detecting the slipping condition of the wheels have been found to be unsuitable because of the need for frequent servicing and repair thereof caused by the constant and severe shock and vibration on the parts of the devices transmitted from the wheel and axle assembly of the car truck.

It is accordingly an object of our present invention to provide a rotary inertia device capable of direct association with the wheel and axle assembly of railway car trucks and requiring only infrequent servicing thereof due to ability to withstand the constant shock and vibrations transmitted from the wheel and axle assembly.

It is another object of our invention to provide a rotary inertia device of the character indicated in the foregoing object and capable of being installed and removed in a relatively short time by relatively unskilled persons. This feature is of particular importance in railway service where the loss of use of a car due to time required in repair or servicing represents a distinct income loss.

The above objects and other more specific objects of our invention which will be made apparent hereinafter are attained by means of an embodiment of our invention subsequently to be described and shown in the accompanying drawings wherein Fig. 1 is a simplified diagrammatic view of a fluid pressure brake system for a railway car showing our improved rotary inertia operated control device employed therein for the detection of the slipping condition of the car wheels.

Figure 2:
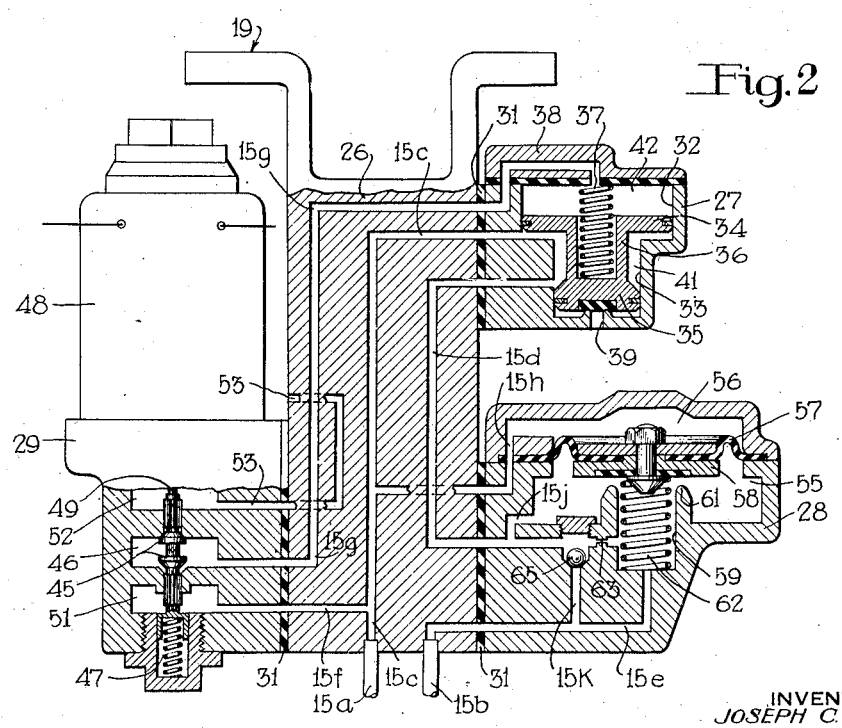

Fig. 2 is an enlarged view, principally in vertical section, showing details of a control valve mechanism employed in the brake system of Fig. 1 for the purpose of controlling the supply and the release of fluid under pressure to and from the brake cylinders.

Figure 3:
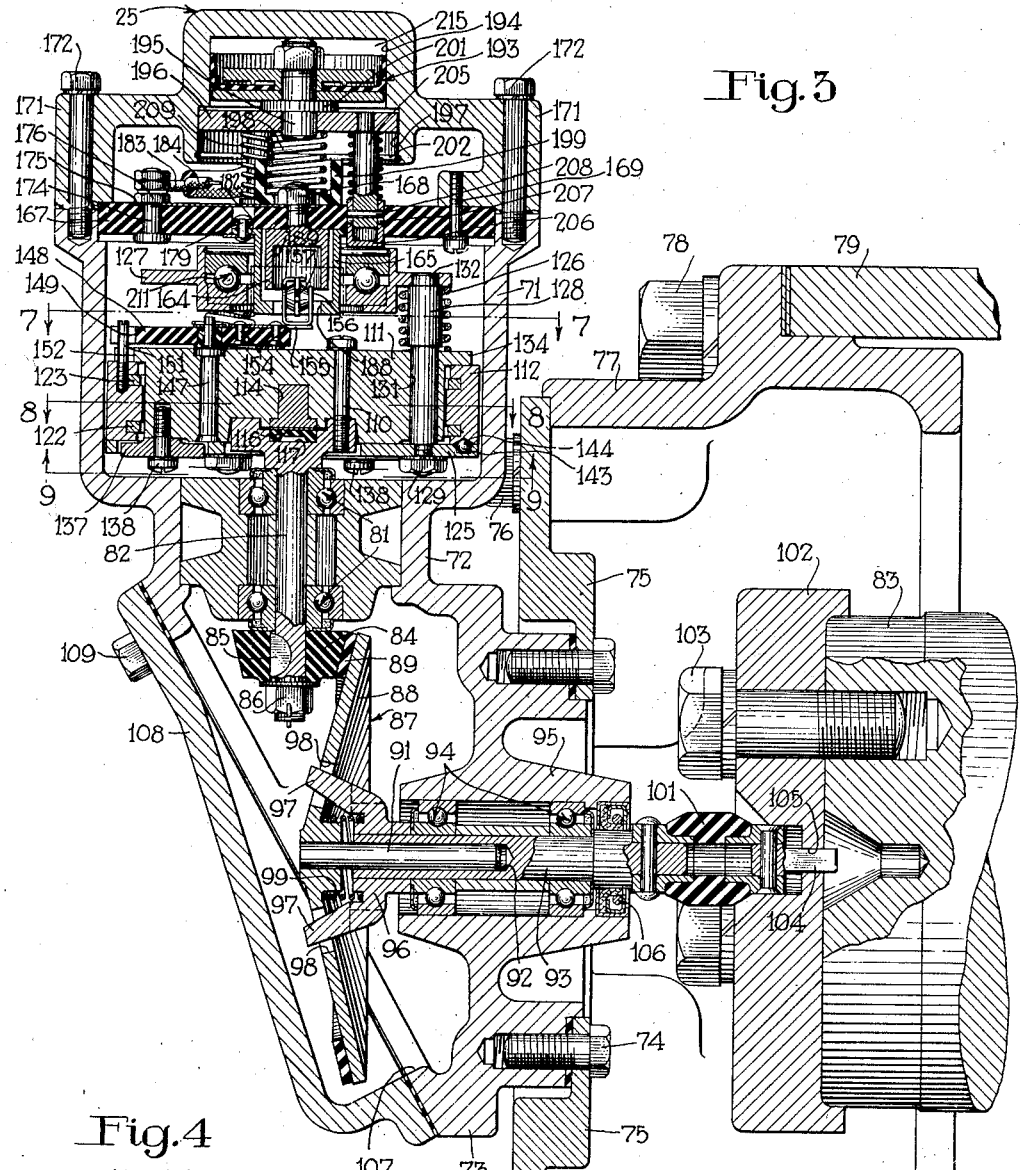
Figure 4:
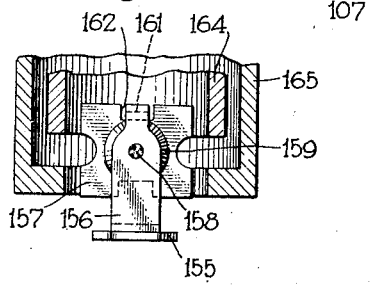
Figure 5:
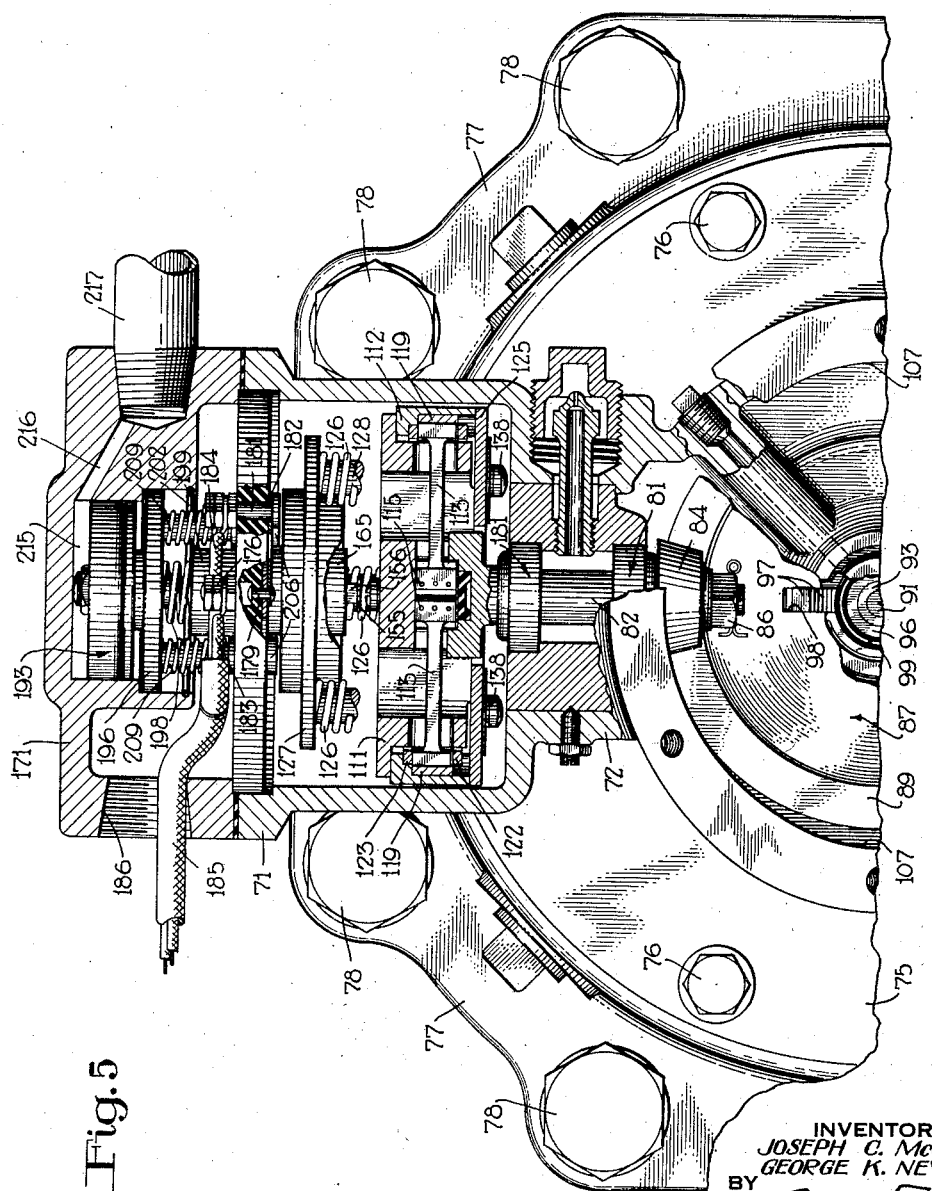
Figure 6:
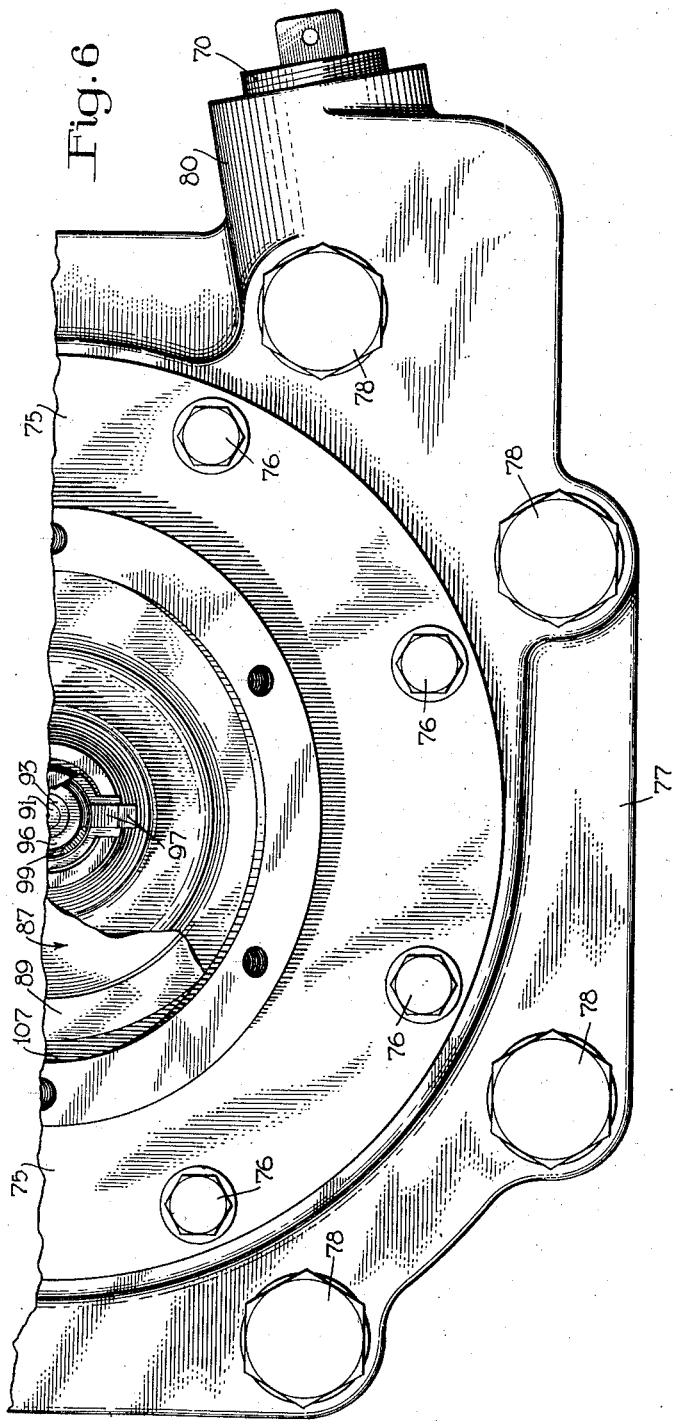
Figure 7:
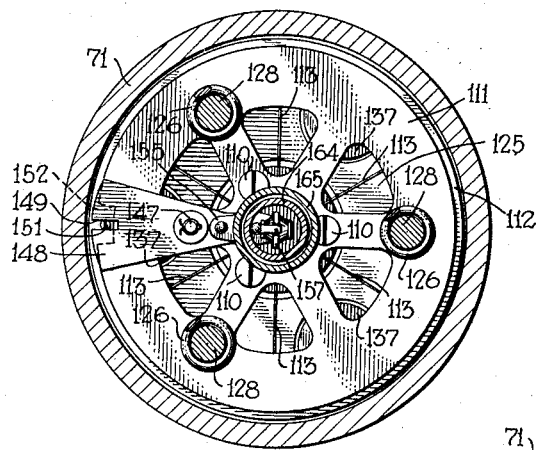

Fig. 3 is an enlarged vertical sectional view showing details of our improved inertia operated control device and the manner in which it is mounted in direct association with a wheel and axle assembly of a railway car truck, Fig. 4 is an enlarged view showing details of the switch contacts of the inertia operated control device of Fig. 3, Figs. 5 and 6, taken together, constitute an elevational view, with parts in vertical section, looking toward the end of a wheel and axle assembly, the sectional view of the inertia operated control device being at a right angle to the view shown in Fig. 3, and Figs. 7, 8, and 9 are horizontal section views taken on the lines 7—7, 8—8, and 9—9, respectively, of Fig. 3 showing further details of construction.

Description

Although our improved inertia operated control device may be employed wherever it is desired to detect variations in the rate of acceleration or deceleration of a rotary element or shaft, it will be described herein in connection with a fluid pressure brake control equipment for a railway car for the reason that it was devised particularly for such use and has particular advantage in connection with such use.

Referring to Fig. 1, the fluid pressure brake control equipment shown is that for a single car having two wheel trucks 11 and 12 at opposite ends thereof, respectively. For purposes of our present invention it is immaterial whether the car is a traction vehicle or a trailing (non-traction) vehicle.

The wheel trucks 11 and 12 are indicated as of the four wheel type, each truck having two wheel and axle assemblies and each assembly including two wheels fixed at opposite ends of a connecting axle. Only one wheel 13 of each wheel and axle assembly is shown in Fig. 1.

It is intended that our improved inertia operated control device be employed in standard fluid pressure operated brake equipment of railway cars and trains. In order to demonstrate the utility of our improved inertia operated control device in as simple a manner as possible we have shown merely a simplified form of straight-air brake equipment. As shown, the fluid pressure brake equipment comprises a so-called straight-air pipe 15; a reservoir 16 normally charged with fluid under pressure as from a fluid compressor not shown; a brake valve 17 of the self-lapping type for controlling the pressure in the straight-air pipe; a plurality of brake cylinders 18 one of which is illustratively provided for each wheel and axle assembly and shown in vertical alignment above the corresponding wheel and axle assembly; a control valve mechanism 19 for each wheel truck; and a pressure operated switch 21.

Considering the parts of the brake control equipment in greater detail, the brake valve 17 is of the well known self-lapping type having an operating handle 17a that is fixed on a rotary operating shaft which, in turn, causes operation of the self-lapping valve mechanism of the brake valve. In the normal or brake release position of the brake valve handle 17a, the straight-air pipe 15 is vented to atmosphere through an exhaust port and pipe 23 at the brake valve. Movement of the brake valve handle 17a out of its brake release position into its so-called application zone causes operation of the self-lapping valve mechanism of the brake valve to supply fluid under pressure from the reservoir 16 to the straight-air pipe 15 to establish a pressure therein substantially in proportion to the degree of displacement of the brake valve handle out of its brake release position. In the event of reduction of the pressure of fluid in the straight-air pipe 15 for any reason, such as leakage, the self-lapping valve mechanism of the brake valve operates inherently to maintain a pressure therein corresponding to the position of the brake valve handle.

The brake cylinders 18 are of standard construction and contain pistons on which the fluid under pressure supplied thereto acts for exerting a force, through conventional brake rigging and levers, not shown, to effect application of the usual brake shoes to the treads of the car wheels 13.

Fluid under pressure is supplied from the straight-air pipe 15 to the brake cylinders 18 through a branch pipe having two sections 15a and 15b respectively, the control valve mechanism 19 for the corresponding truck being interposed between and connected to the two pipe sections. As will be explained in greater detail presently, the control valve mechanism 19 establishes communication through which fluid under pressure may be supplied to and released from the brake cylinders 18 in accordance with variations of the pressure in the straight-air pipe 15 under normal conditions. Under abnormal conditions, that is, the slipping condition of the vehicle wheels, the control valve mechanism 19 is operated automatically under the control of our improved inertia operated control devices for the purpose of controlling the pressure in the brake cylinders of the slipping wheels in a manner to prevent the sliding thereof. As will be apparent in Fig. 1, each wheel and axle assembly is provided with our improved inertia operated control device 25 and the two devices for a single car truck function separately and individually to control the corresponding control valve mechanism 19.

Referring to Fig. 2, each control valve mechanism 19 comprises a casing having a pipe bracket section 26, a vent valve section 27, a reapplication control valve section 28, and a magnet valve section 29, the three sections 27, 28, and 29 being secured to the pipe bracket section 26 through intervening sealing gaskets 31 by securing bolts or screws not shown.

The vent valve casing section 27 has two coaxial bores 32 and 33 of larger and smaller diameter respectively in which an operating piston 34 and a valve piston 35 connected by a tubular stem 36 respectively operate. A coil spring 37 received in the interior of the tubular stem 36 and interposed between a cover plate 38, closing the open end of the bore 32, and the valve piston 35 is normally effective to urge the piston 34 and valve piston 35 to a position in which the valve piston 35 closes an exhaust port 39 opening out of the bore 33. In this position of the valve piston 35, communication is established by the annular chamber 41 formed between the piston 34 and valve piston 35, from a passage 15c to a passage 15d. The pipe 15a is connected to the passage 15c and thus when fluid under pressure is supplied to the pipe 15a, it flows through the passage 15c and chamber 41 to the passage 15d. The passage 15d leads to the reapplication control valve section 28 which, in turn, establishes communication in the manner hereinafter to be described between the passage 15d and a passage 15e which is, in turn, connected to the pipe 15b leading to the brake cylinders 18.

Formed in the bore 32 on the upper side of the piston 34 is a pressure chamber 42 to which fluid under pressure is supplied from the pipe 15a and passage 15c through branch passages 15f and 15g under the control of the magnet valve section 29.

The magnet valve section 29 comprises a double beat valve 45 which is contained in a chamber 46 and normally urged to an upper seated position by a coil spring 47. A magnet winding or solenoid 48 is effective when energized to actuate a plunger 49 to shift the double beat valve 45 to its lower seated position in opposition to the spring 47.

In its upper seated position, the double beat valve 45 establishes communication between chamber 46 and a chamber 51. The passages 15f and 15g open respectively into the chambers 51 and 46 and consequently communication is established between the passages 15f and 15g to cause fluid under pressure to be supplied to the chamber 42 of the vent valve section 27 as long as the magnet winding 48 is deenergized.

When the magnet winding 48 is energized and the double beat valve 45 is shifted to its lower seated position, communication between the passages 15f and 15g is closed and, at the same time, communication is established from the chamber 46 to a chamber 52 that is constantly open to atmosphere through an exhaust passage and port 53. When the magnet winding 48 is energized, therefore, communication is established from the passage 15g to the exhaust passage and port 53 and fluid under pressure is vented from the chamber 42 of the vent valve section 27 at a rapid rate.

The reapplication control valve section 28 has two chambers 55 and 56 separated by a movable abutment or flexible diaphragm 57 that carries a disk type valve 58 on the side thereof open to the chamber 55. Chamber 56 is constantly connected to the passage 15c through a branch passage 15h and the chamber 55 is constantly open to the passage 15d through a branch passage 15j.

The valve 58 controls communication between the chamber 55 and the passage 15e leading to the brake cylinder pipe 15b. The passage 15e opens into the lower end of a bore 59, the upper open end of which is surrounded by an annular rib seat 61 on which the valve 58 is arranged to seat in the manner presently to be described. A coil spring 62, contained in the bore 59, normally biases the diaphragm 57 and valve 58 to an unseated position with respect to the rib seat 61, thereby establishing communication through which fluid under pressure may be supplied at a rapid rate from the passage 15d and chamber 55 to the passage 15e.

When the pressure in the chamber 55 is reduced a certain amount, such as five pounds per square inch, below the pressure in the chamber 56, the differential fluid pressure force active on the diaphragm 57 overcomes the spring 62 and seats the valve 58 on the rib seat 61, thereby closing communication between the chamber 55 and the passage 15e.

The passage 15d is connected into the bore 59 and thus to passage 15e through a restricted port or choke 63. The passage 15d is also connected to the passage 15e through a branch passage 15k under the control of a one-way or check valve 65 of the ball type which prevents the flow of fluid from the passage 15d to the passage 15e but permits reverse flow of fluid from the passage 15e to the passage 15d at a rapid rate.

Briefly the operation of the control valve mechanism 19 is as follows:

With the magnet winding 48 deenergized, fluid under pressure supplied to the straight-air pipe 15 flows through the branch pipe 15a and thence, simultaneously, through the communications previously described to the chambers 42 and 41 on opposite sides of the piston 34 of the vent valve section 27. Valve piston 35 is accordingly maintained seated to close the exhaust port 39 and maintain a communication between the passages 15c and 15d.

Fluid under pressure is thus supplied from the passage 15c to the passage 15d, whence it flows to the chamber 55 and then past the unseated valve 58 to the passage 15e and pipe 15d leading to the brake cylinders 18. The supply of fluid under pressure from passage 15c through the branch passage 15h to the chamber 56 causes the pressure of fluid in the chamber 56 to be built-up substantially in unison with the pressure in the chamber 55 and consequently the spring 62 maintains the valve 58 unseated.

It will thus be seen that with the magnet winding 48 deenergized, fluid under pressure is supplied to the brake cylinders 18 at a rapid rate in response to the build-up of pressure in the straight-air pipe 15.

Upon a reduction of the pressure in the straight-air pipe 15, fluid under pressure flows reversely from the pipe 15b through the passage 15d to the passage 15c so that the pressure in the brake cylinders 18 is reduced in accordance with the reduction of the pressure in the straight-air pipe 15.

Upon energization of the magnet winding 48, fluid under pressure in the chamber 42 of the vent valve section 27 is rapidly vented to atmosphere through the exhaust port and passage 53. The higher pressure of fluid in the annular chamber 41 is accordingly effective on the piston 34 to urge it upwardly into seated relation on the gasket interposed between the cover plate 38 and the casing section 27. In this position of the piston 34, the valve piston 35 is positioned between the passages 15c and 15d. The passage 15d is thus vented to atmosphere through the exhaust port 39 and fluid under pressure is vented at a rapid rate from the brake cylinders 18 through the pipe 15b, passage 15e, past the ball check valve 65 and past the valve 58 (as long as it is unseated) to the passage 15d and thence to atmosphere through the exhaust port 39. It will be recalled that whenever the pressure in the chamber 55 reduces a certain amount, such as five pounds per square inch, below the pressure in the chamber 56, the valve 58 is seated. It is accordingly necessary to provide the ball check valve 65 in order to by-pass the valve 58 and permit fluid under pressure to be vented from the brake cylinders after valve 58 is seated.

As long as the chamber 42 of the vent valve section 27 remains vented to atmosphere, the higher pressure from the passage 15c active on the piston 34 maintains the valve piston 35 in a position establishing communication from the passage 15d to the atmospheric exhaust port 39. Consequently, as long as the magnet winding 48 is energized, fluid under pressure continues to be exhausted from the brake cylinders.

When the magnet winding 48 is subsequently deenergized, fluid under pressure is rapidly resupplied past the double beat valve 45 of the magnet valve section 29 to the chamber 42 of the vent valve section 27, thereby rapidly equalizing the pressures on opposite sides of the piston 34 and rendering the spring 37 effective to restore the valve piston 35 to seated position closing the exhaust port 39 and reestablishing communication between the passages 15c and 15d. Upon the reestablishment of the connection between the passages 15d and 15c, fluid under pressure is supplied from the passage 15d to the passage 15e and brake cylinder pipe 15b only through the restricted port 63 until such time as the valve 58 is again unseated. The build-up of pressure in the brake cylinders 18 is thus at a restricted rate until the pressure of fluid reestablished in the chamber 55 approaches within five pounds per square inch pressure of the pressure in the chamber 56. When this occurs, spring 62 is effective to urge the diaphragm 57 upwardly and unseat the valve 58. Thereafter, fluid under pressure is supplied at a rapid rate past the unseated valve 58 to the passage 15e so that the build-up of pressure in the brake cylinders is at a rapid rate.

As will be described more fully hereinafter, the magnet winding 48 is energized automatically under the control of the inertia operated control devices 25 of the corresponding wheel truck whenever the wheels of that truck are in a slipping condition. It will thus be seen that when slipping of the wheels occurs, control valve mechanism 19 operates to rapidly reduce the pressure of the fluid in the brake cylinders and subsequently to resupply fluid under pressure at a restricted rate to the brake cylinders.

The control valve mechanism 19 is disclosed essentially in principle in Patent No. 2,283,608 of Joseph C. McCune, one of the present joint applicants, and is claimed therein. No claim to the features of the control valve mechanism 19 is accordingly made in the present application.

Referring to Figs. 3, 5, and 6, our improved inertia operated control device 25 and the manner in which it is mounted in direct association with the axle of a wheel and axle assembly is shown in detail. As shown particularly in Fig. 3, the inertia operated control device 25 comprises a vertically disposed cylindrical casing 71 having a neck portion 72 of reduced diameter and a lower portion 73 that is secured, as by a plurality of screws 74, to a mounting disk 75. The mounting disk 75 is in turn secured as by a plurality of screws 76 to an adapter ring 77 which is, in turn, secured by a plurality of screws or bolts 78 to the open end of the axle journal casing 79 in place of the usual end cover.

Suitably journaled for rotation on a vertical axis in the neck portion 72 of the casing, as by a plurality of ball-bearing races 81, is a rotary shaft 82 that is connected through a friction drive mechanism, presently to be described, to the axle 83 of a wheel and axle assembly. The axle of the assembly is journaled as by roller bearings, not shown, in the journal casing 79 in the usual manner.

The friction drive mechanism just mentioned comprises a conical pinion of suitable material, such as hard rubber, or other moulded or plastic material, and is secured to the lower end of the shaft 82 as by a key 85 and nut 86 screwed on the threaded lower end of the shaft 82 and locked thereto.

The conical pinion 84 frictionally engages a conical drive gear or disk 87 having a body portion 88 of suitable metal and a friction ring 89 of rubber or other suitable friction material adjacent the periphery thereof and directly engaging the pinion 84.

The drive disk 87 is fixed to a stem 91 that is axially slidable in a bore 92 of a shaft 93 that is journaled, as by spaced ball-bearing races 94 in the hub 95 formed in the lower portion 73 of the casing.

A clutch sleeve 96 is secured, as by a press fit, on the shaft 93 and has two diametrically disposed and axially extending fingers 97 that slidably engage in radial slots 98 formed or cut in the body 88 of the drive disk 87. A coil spring 99 that is interposed between the clutch sleeve 96 and the center of the disk 87, biases the friction ring 89 of disk 87 into firm frictional contact with the pinion 84 at all times.

The shaft 93 is connected through an intervening flexible coupling 101 to a disk member 102 that is removably secured to the end of the axle 83 as by a plurality of screws 103. The coupling 101 has a squared end portion 104 that engages in a rectangular slot 105 in the disk 102 so as to permit the coupling and uncoupling of the shaft 93 to and from axle 83 merely by axial movement toward and from the end of the axles.

An oil retainer ring 106 is provided in the end of the hub portion 95 whereby to prevent the escape of the oil in the oil reservoir chamber of the journal 79 along the shaft 93. As shown in Fig. 6, the adapter ring 77 has a filling spout 80 through which oil may be poured into the oil chamber of the journal 79. A screw plug 70 is provided to close the spout 80.

The portion 73 of the casing has a circular opening 107 therein and arranged to be closed by a cover plate 108, that is removably secured to the casing, as by a plurality of screws 109. Installation and removal of the pinion 84, drive disc 87 and shaft 93 may thus be effected through the opening 107 without removal of the casing 73 and consequently without draining oil from the oil chamber of journal casing 79.

The pinion 84 and drive ring 87 may have any desired drive ratio. As shown, the drive ratio of the ring 87 to the pinion 84 is approximately a four to one ratio. It will thus be seen that the shaft 82 rotates in accordance with the rotational speed of the axle 83 but at a proportionately higher speed. The speed multiplication of the shaft 82 with respect to the speed of the axle 83 is desirable for a reason which will be hereinafter made apparent.

Figure 8:
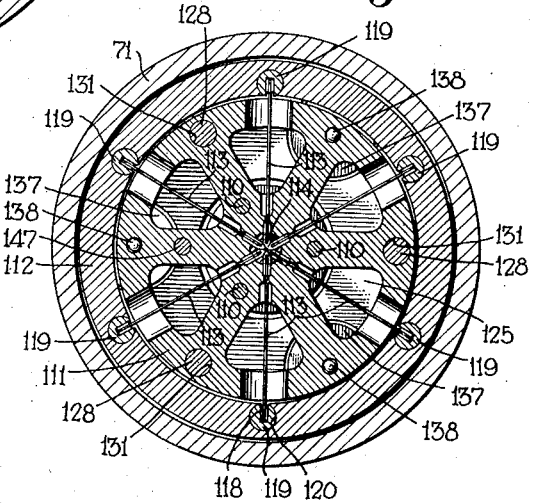
Figure 9:
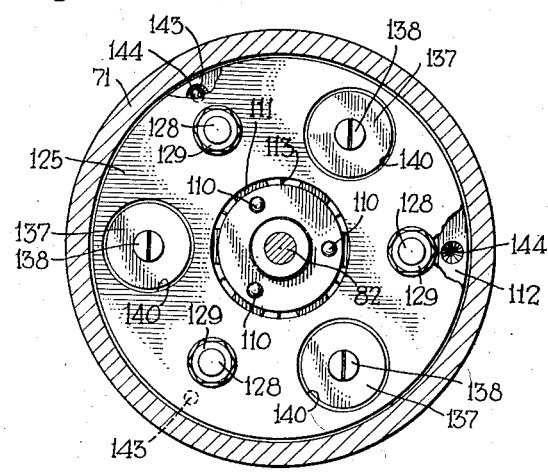

Secured to the upper larger diameter end of the shaft 82, as by a plurality of screws 110 is a spider member 111 of suitable metal, such as aluminum or brass. Spider member 111 is not solid but, as shown in Fig. 8, resembles a wheel having a hub, rim and radial spokes.

Supported in associated relation to the spider 111 is an inertia ring or fly-wheel 112. The fly-wheel 112 is supported in associated relation with the spider 111 by a plurality of leaf springs 113 (see Fig. 8) shown illustratively as six in number. The leaf springs 113 are disposed in radially bisecting relation to the openings in the spider (see Fig. 8) and are anchored in a bore 114 or at the central or hub portion of the spider member 111 in a suitable manner. Thus, as shown, solder is poured into the bore 114 to fill it and allowed to harden, thus anchoring the ends of the leaf springs. In order to assist in anchoring the inner ends of the leaf springs 113, small holes 115 (see Fig. 5) are drilled through the leaf springs and the solder, poured into the bore 114, fills the holes 115.

A cup washer or disk of resilient material, such as rubber is confined in a recess 117 in the end of the shaft 82 between the block of solder and the end of the shaft so as to permit a metal-to-metal contact of the end of the shaft with the face of the spider 111, without requiring the outer surface of the block of solder to be ground or machined, while at the same time maintaining a clamping force retaining the block of solder in the bore 114. It is essential that the spider 111 rotate in a plane perpendicular to the shaft 82 and any unevenness in the outer surface of the block of solder would, if permitted to engage the end of the shaft 82, interfere with this relation of the spider to the shaft.

The openings in the spider 111 through which the leaf springs 113 extend are such as to permit bending of the springs in opposite directions from their normal radial orientation and thus to permit relative rotative movement of the fly-wheel 112 with respect to the spider 111. Moreover, the outer ends of the leaf springs 113 are not fixedly secured to the fly-wheel 112 because this would prevent rotation of the fly-wheel relative to the spider 111. The leaf springs 113 are, therefore, associated with the fly-wheel by a loose connection presently to be described, so as to permit the rotative movement of the fly-wheel relative to the spider. As will be seen in Figs. 5 and 8, the outer end of each of the leaf springs 113 is slidably received in a substantially radial slot 118 of a cylindrical member 119 that is rotatable in a corresponding circular hole 120 of similar diameter, bored axially in the rim of the fly-wheel 112, Cylinders 119 rotate in the holes 120 and the leaf springs slide outwardly from the slots 118 to permit rotational movement of the fly-wheel relative to the spider 111.

The cylindrical members 119 are retained in position in the holes 120 by means of a snap ring 122 that engages in a suitable annular groove on the inner periphery of the fly-wheel 112. The snap ring 122 and a similar snap ring 123 at the opposite end of the cylindrical members 112 serve to retain the outer ends of the leaf springs in the slots 118 of the cylindrical members 119.

It will thus be seen that when the shaft 82 is rotatively accelerated or decelerated, the fly-wheel 112 rotatively shifts in a lagging or leading direction respectively from its normal position with respect to the spider 111, the degree of displacement of the fly-wheel corresponding substantially to the rate of rotative acceleration or deceleration of shaft 82.

The weight of the fly-wheel 112 and the design of the leaf springs 113 are such that a predetermined displacement of the fly-wheel from its normal position with respect to the spider 111 is not attained unless the axle 83 rotatively accelerates or decelerates in excess of a certain rate, corresponding for example to ten miles per hour per second rotative deceleration of the vehicle wheels, which occurs only when the wheels are in a slipping condition. The predetermined displacement of the fly-wheel 112 from its normal rotative position with respect to the spider is utilized to operate switch contacts presently to be described.

The reason for the speed multiplication of the shaft 82 with respect to the speed of the axle 83 should now be apparent for, by reason of the speed multiplication, the diameter and weight of the fly-wheel 112 may be made relatively small. Thus, the actual diameter of the fly-wheel 112 may be of the order of four or five inches and the weight thereof substantially one pound. By minimizing the weight of the fly-wheel 112, it is possible to employ bearings, such as the ball-bearing races 81, capable of withstanding the severe shock and jars transmitted from the axle 83.

The leaf springs 113 are so designed that the total edgewise bending strength of the six leaf springs is capable of supporting the fly-wheel without undue stress and strain. However, if the fly-wheel 112 were wholly supported on the outer ends of the leaf springs 113 at all times, the constant vertical vibration of the fly-wheel would set up undesirably high stresses in the springs 113 which would ultimately result in breakage of the springs. We have accordingly provided an arrangement, which constitutes one of the novel features of our present invention, whereby the fly-wheel 112 is positively clamped or clutched to the spider 111 at such time as operation of the rotary inertia device is not required. As will be made apparent hereinafter, we have provided an arrangement whereby the fly-wheel 112 is positively clamped to the spider 111, as long as the brakes are released, and is released from the positive clamping relation at the periphery of the spider 111 only upon application of the brakes. Since the brakes are applied on a railway car only a relatively small percentage of the time that the car is in operation, it will be seen that the constant stressing of the leaf springs 113 due to vertical vibration of the fly-wheel 112 is thereby avoided. The length of time between inspection and servicing periods and the life of the device are thereby greatly lengthened.

The apparatus whereby the fly-wheel 112 is positively clamped at the periphery of the spider 111 includes a clutch plate or disk 125 (see Figs. 3 and 5) which is normally yieldingly urged into metal-to-metal contact with the lower face of the spider 111 by a plurality of coil springs 126, illustratively shown as three in number. (See Fig. 7.) The springs 126 are interposed between the upper face of the spider 111 and a thrust bearing retainer ring 127 which is connected to the clutch disk 125 by a plurality of pins or bolts 128, shown as three in number. (See Fig. 9.)

As seen particularly in Fig. 3, the bolts 128 are secured at the lower end thereof, as by nuts 129, to the clutch disk 125 and extend slidably through suitable circular bores 131 extending axially through the body of the spider 111. The upper ends of the bolts 128 are secured, as by a press fit, in suitable circular holes 132 in the retainer ring 127. The portion of the bolts 128 between the upper face of the spider 111 and the retainer ring 127 is of larger diameter than the remaining portion of the bolts and springs 126 are conveniently disposed in concentric relation around this portion of the bolts. The length of the larger diameter portion of the bolts is such that only a limited axial movement of the bolts 128 and of the clutch disk 125 with respect to the lower face of the spider 111 is permitted. This movement is of the order of twenty thousandths of an inch.

As will be seen in Fig. 3, the spider 111 has an annular flange 134 at the upper face thereof that is larger in diameter than the main body of the spider. In a similar manner, the clutch disk 125 is of larger diameter than the main body of the spider 111. An annular groove slightly wider than the axial depth of the fly-wheel 112 is accordingly provided between the flange 134 and the clutch disk 125 within which the fly-wheel 112 is disposed. When the springs 126 urge the clutch disk 125 toward the lower face of the spider 111, the fly-wheel 112 is positively clamped or clutched between the flange 134 and the disk 125, thus positively supporting the fly-wheel 112 from the spider 111 independently of the leaf springs 113 and preventing vertical vibration of the fly-wheel axially with respect to the shaft 82.

When the retainer ring 127 is shifted downwardly, in the manner presently to be described, the bolts 128 and consequently the clutch disk 125 are shifted downwardly to the limited degree previously mentioned, thereby releasing the fly-wheel 112 from clutched relation to the spider 111 and permitting it to disengage the spider and be supported wholly on the outer ends of the leaf springs 113.

The degree of movement of the clutch disk 125 with respect to the spider 111, being of the order of twenty thousandths of an inch, is greater than the permissible displacement of the fly-wheel 112 vertically within the maximum stress limit of the leaf springs 113. In order, therefore, to confine the vertical movement of the fly-wheel 112 with respect to the spider 111 to a degree within the maximum bending strength of the leaf springs 113, a plurality of stop disks or washers 137 are secured, as by screws 138, to the lower face of the spider 111. These stop disks 137 are illustratively shown as three in number and spaced substantially 120° apart, particularly in Fig. 9. The clutch disk 125 is provided with suitable circular openings or holes 140 of larger diameter than the stop disks 137 within which the stop disks 137 are located. It is thus possible for the clutch disk 125 to shift vertically with respect to the spider 111 without affecting the fixed relation of the stop disks 137 to the spider 111. The stop disks 137 are of such diameter and are mounted close to the periphery of the main body of the spider 111 in such a manner as to project beneath the fly-wheel 112. The distance between the upper flange 134 on the spider and the stop disks 137 is such as to limit the relative axial movement, in a vertical direction, between the fly-wheel 112 and the spider 111 to a safe maximum value within the maximum bending strength of the leaf springs 113, such as seven or eight thousandths of an inch.

It will thus be seen that when the clutch disk 125 is shifted downwardly from the lower face of the spider 111, the fly-wheel 112 is permitted to drop of its own weight, to a degree permitted by the strength of the leaf springs 113, out of contact with the upper flange 134 several thousandths of an inch. As the same time, the lower edge of the fly-wheel 112 clears the stop disks 137 by several thousandths of an inch. Thus the fly-wheel 112 is supported wholly on the outer ends of the leaf springs 113 and is free to shift rotatively with respect to the spider 111 in response to inertia forces acting thereon. At the same time, if the vibration or shock produced on the axle 83 and transmitted to the fly-wheel 112 is such as to cause it to vibrate vertically, the degree of movement of the fly-wheel 112 with respect to the spider 111 is within the maximum edgewise heading stress limit of the leaf springs 113.

For reasons which will be hereinafter explained, it is desirable to maintain the fly-wheel 112 in a fixed rotative position with respect to the spider 111 under normal conditions while clamped between the clutch disk 125 and the flange 134 of the spider 111. We have accordingly provided automatic means for positioning the fly-wheel 112 in its fixed normal rotative position with respect to the spider 111 when the clutch disk 125 is raised toward the lower face of the spider 111. This arrangement includes a plurality of hardened steel balls, shown as three in number, retained in circular recesses 143 in the upper surface of the clutch disk 125 and registering in the normal rotative position of the fly-wheel 112 with conical recesses 144 in the lower face of the fly-wheel 112. Thus, when the clutch disk 125 is raised into contact with the lower face of the spider 111, the balls 143 seat themselves in the deepest portion of the conical recesses 144, thereby automatically positioning and locking the fly-wheel 112 in a fixed normal rotative position with respect to the spider 111. The amount of clearance between the clutch disk 125 and the lower face of the spider 111 is such with relation to the size of balls 143 and the conical recesses 144 as not to interfere with the desired degree of rotative movement of fly-wheel 112 with respect to spider 111.

The relative rotational movement of the fly-wheel 112 with respect to the spider 111 is utilized to operate switch contacts in the manner now to be described. Pivotally mounted on a pin 147, secured as by riveting in the body of the spider 111, is a contact arm 148 of insulating material. (See Figs. 3 and 7.) The contact arm 148 is supported in substantially parallel relation to the plane of rotation of the spider 111 above the upper face of the spider 111 and has a radially extending slot 149 in the outer end thereof into which a pin 151, screwed into the rim of the flywheel 112, extends. In this connection, the flange 134 of the spider 111 has a circumferential slot 152 which permits the required movement of the pin 151 between the spaced ends of the slot.

A metallic contact member 155 is secured to the inner end of the contact arm 148, as by a plurality of rivets 154 (Figs. 3 and 4). A U-shaped bracket member 156 is secured, as by spot welding, to the inner end of the member 155. A substantially rectangular contact member 157 is pivotally mounted between the prongs of the bracket 156, as on a pin 158 (see Fig. 4). Spacing collars 159 are interposed on opposite sides of the contact member 157 to center it between the prongs of the bracket 156. Rocking movement of the contact member 157 on the pin 158 is limited by an extension 161 of one of the prongs of the bracket 156, which extends into a recess 162 in the contact member 157. The contact member 156 is so located and so oriented as to lie in a plane that intersects the axis of rotation of the shaft 82.

Cooperating with the contact member 157 are two concentric tubular contact cylinders 164 and 165, mounted in the manner presently described in coaxial relation to the shaft 82. The inner contact cylinder 164 has a threaded stem 166 which extends through a suitable hole in a supporting disk 167 of insulating material and which is secured thereto as by a nut 168. The insulating disk 167 is, in turn, secured as by a plurality of screws 169 to a cover member 171 that is attached, as by a plurality of screws 172, to the upper rim of the cylindrical casing 71 in a manner to close the upper open end thereof.

The contact cylinder 164 is connected to a terminal stud or post 174, secured in the insulating disk 167, by means of a connecting metallic link 175 which lies in a recess in the upper face of the insulating disk 167, the opposite ends of the link being secured under the nut 168 on the stem 166 of the cylinder 164 and a nut 176 on the terminal post 174.

The contact cylinder 165 is located in concentric outwardly spaced relation to the inner contact cylinder 164 and has an outwardly extending flange at the upper end thereof which is secured, as by a plurality of rivets 179, to the lower face of the insulating disk 167. The contact cylinder 165 is electrically connected to a terminal stud or post 181, (Fig. 5) secured in the insulating disk 167, by means of a connecting link 182. The connecting link 182 lies along the lower face of the insulating disk 167 and the opposite ends thereof are secured under the outer head of one of the rivets 179 and the head of the terminal post or bolt 181.

The two terminal posts 174 and 181 are provided with nuts on the upper ends thereof for securing wires 183 and 184, respectively, thereto. The wires may be contained in a cable 185 that is conducted out through an opening 186 in the cover member 171 (see Fig. 5).

The outer contact cylinder 165 is provided with a radially inwardly extending portion at the lower end thereof having a circular opening 188 which is of substantially the same diameter as the inner bore 189 of the inner contact cylinder 164. The contact cylinders 164 and 165 are so located that the contact member 157 is normally centered in the circular opening 188 and bore 189 and does not engage the cylinders. When displaced laterally from its central position a predetermined amount, one edge of the contact member 157 engages the contact cylinders 164 and 165 simultaneously. The degree of lateral displacement of the contact member 157 required to cause simultaneous engagement thereof with the cylinders 164 and 165 occurs only in response to a corresponding pivotal movement of the contact arm 148 resulting from the relative rotational movement of the fly-wheel 112 with respect to the spider 111. The amount of rotational movement of the fly-wheel 112 with respect to the spider 111 required to cause sufficient pivotal movement of the contact arm 148 to effect the engagement of the contact member 157 with the contact cylinders 164 and 165 occurs only in response to the rotative deceleration or acceleration of the axle 83 at a rate exceeding a certain rate, such as ten miles per hour per second which, in turn, occurs only when the wheels associated with the axle are in a slipping condition.

It will be apparent that when the axle 83 exceeds a rate of rotative deceleration corresponding to ten miles per hour per second retardation of the car wheels, contact member 157 connects the contact cylinders 164 and 165 in response to displacement of the fly-wheel 112 in a leading direction with respect to the spider 111. In a similar manner, when axle 83 rotatively accelerates at a rate exceeding ten miles per hour per second acceleration of the car wheels, the rotative displacement of the fly-wheel 112 in a lagging direction with respect to the spider 111 causes rocking movement of the contact arm 148 in the opposite direction to effect engagement of the opposite edge of contact member 157 with the contact cylinders 164 and 165. Thus, whenever a predetermined rate of rotative deceleration or acceleration of the axle 83 is exceeded, the contact cylinders 164 and 165 are connected by the contact member 157.

It will be apparent that when the spider 111 and flywheel 112 are rotating, the contact member 157 merely wipes the contact cylinders in sliding contact while establishing the electric connection between the cylinders 164 and 165. This sliding contact of the contact member 157 with the cylinders 164 and 165 maintains a highly polished contact surface minimizing surface tarnish or corrosion of the cylinders and thereby preventing the development of a high contact resistance.

As previously stated, the clamping disk 125 is normally urged upwardly into contact with the lower face of the spider 111 by means of coil springs 126 and shifted downwardly out of contact with the spider 111 in response to a force shifting the retainer ring 127 downwardly in opposition to the springs 126.

The means whereby the thrust bearing retainer ring 127 is shifted downwardly comprises a piston 193 that operates in a bore 194 of the cover member 171 (Fig. 3). The piston 193 has stem 195 in the form of a bolt extending through a central opening therein. The stem 195 extends through a central circular opening in a guide disk 196 that operates in a bore 197 of slightly larger diameter than the bore 194 and coaxially positioned with respect thereto. A coil spring 198 is interposed in concentric relation around the stem 195 between the central portion of the guide disk 196 and a retainer cup 199 of insulating material, that rests on the upper face of the insulating disk 167. Retainer cup 199 has a central opening into which the nut 168 extends. Spring 198 yieldingly urges the guide disk 167 upwardly into engagement with a collar 201 formed on the piston stem 195. Upward movement of the piston 194 is, in turn, limited by the engagement of the upper end of the stem 195 with the outer wall of the cover member 171.

A snap ring 202 engaging in a suitable annular groove in the bore 197 serves to retain the guide disk 196 in the bore 197 upon removal of the cover member 171 from the cylindrical casing 71.

Secured to the guide disk 196, in substantially 120° angular relation, are three pins 205. A cylindrical cushioning cap 206 is slidably mounted on the lower end of each of the pins 205. The caps 206 are provided with slots 207 into which extend the opposite ends of a pin 208, fixed transversely in the pins 205, thereby limiting the movement of the caps with respect to the pins 205. Concentrically surrounding each pin 205 between the guide disk 196 and the inner end of the cap 206 thereon is a coil spring 209 which yieldingly urges the caps to an outer position and cushions the movement of the caps to their inner position.

The insulating disk 167 is provided with three circular openings through which the pins 205 and cushioning caps 206 extend to the lower side of the insulating disk 167.

Contained within the retainer ring 127 is a thrust bearing race 211 of the ball-bearing type, the upper ring of which is engaged by the cushioning caps 206 on the pins 205 upon downward movement of the guide disk 196. It will thus be seen that whenever the guide disk 196 is shifted downwardly a sufficient degree, the cushioning caps 206 on the pins 205 first engage the upper thrust bearing ring and are then shifted relatively to the pins 205 in response to the yielding of the springs 209 to their inner position engaging pins 208 thus producing a direct application of force from the guide disk to the thrust bearing race 211. Further downward movement of the guide disk 196 results in downward movement of the retainer ring 127, in opposition to the yielding force of the springs 126, to effect the downward movement of the clutch disk 125. It will be seen that the thrust bearing race 211 enables a force to be exerted to disengage the clutch disk 125 and free the flywheel 112 for rotational movement relative to the spider 111 while the shaft 82 is rotating.

According to our invention, fluid under pressure is supplied to a chamber 215 on the upper side of the piston 193 to exert a force on the piston effective to shift the guide disk 196 downwardly and thereby to effect the ultimate disengagement of the clutch disk 125 from the spider 111. As seen particularly in Fig. 5, fluid under pressure may be supplied to the chamber 215, through a passage and port 216 from a supply pipe 217 connected into the port.

According to our invention, fluid under pressure is supplied through the pipe 217 to the piston chamber 215 only when the brakes on a car are applied. Various arrangements may be provided for this purpose, but I have illustratively shown in Fig. 1 a simplified arrangement whereby to accomplish this result. It will be seen that the pipe 217 is connected in Fig. 1 to the branch pipe 15a leading to the control valve mechanism 19 of the corresponding wheel truck. Alternatively the pipe 217 may be connected directly into the straight-air pipe 15 if desired. In any case, it will be seen from previous description that since the straight-air pipe 15 is charged with fluid under pressure only when the brakes are applied, fluid under pressure will therefore be supplied to the piston chamber 215 only when the brakes are applied. As previously indicated, therefore, the fly-wheel 112 is freed from clutched relation to the spider 111 only when the brakes are applied. The pressure of fluid required to effect unclutching of the fly-wheel may be any selected value, such as fifteen or twenty pounds per square inch.

When fluid under pressure is released from the piston chamber 215 in response to the release of the brakes, the spring 198 restores the guide disk 196 and piston 193 upwardly to their normal positions, thereby permitting the springs 126 to act to shift the clutch disk 125 into clamping relation with respect to the fly-wheel 112.

Referring to Fig. 1, the switch contact cylinders 164 and 165 and the contact member 157 are diagrammatically shown in vertical alignment above the corresponding rotary inertia device 25. In Fig. 1, the contact member 157 is positioned midway between two sets of stationary contacts, each set comprising an upper and a lower contact. The upper contact of each set represents the inner contact cylinder 164, to which the wire 183 is connected. The lower contact of each set represents the outer contact cylinder 165, to which the wire 184 is connected.

The contact cylinders 165 of all of the rotary inertia devices 25 on a given car are connected by a common wire 184 which is in turn connected by a branch wire 219 to one terminal, such as the positive terminal, of a source of direct current indicated as a storage battery 220.

The contact cylinders 164 of the two rotary inertia devices 25 for a given wheel truck 11 or 12 are connected by a common wire 183 that is in turn connected to a wire 221 having in series relation therein the magnet winding 48 of the control valve mechanism 19 for that wheel truck. The wire 221 from each of the magnet windings 48 on the car is connected to a wire 222 having in series relation therein the contacts of the pressure operated switch 21. The wire 222 is in turn connected to the negative terminal of the storage battery 220.

The pressure operated switch 21 is of any suitable snap-acting type responsive to the supply of fluid under pressure thereto and the release of fluid under pressure therefrom. The pressure chamber of the pressure switch 21 is connected by a branch pipe 15m to the straight-air pipe 15 and fluid under pressure is thus supplied to and released from the switch 21 in accordance with the supply and the release of the fluid under pressure to and from the straight-air pipe 15. The pressure switch 21 is so designed that when the pressure of fluid supplied thereto exceeds a certain low value, such as five pounds per square inch, the contacts of the switch are operated to closed position and remain in closed position as long as the pressure exceeds five pounds per square inch. Conversely, when the pressure in the straight-air pipe 15 reduces below five pounds per square inch, the contacts of the switch 21 are restored to their open position.

It will thus be seen that the circuits for the magnet windings 48 of the control valve mechanisms 19 cannot be completed, in response to the operation of the corresponding rotary inertia devices 25, unless the switch 21 is in closed position, which is the case only when the brakes are applied.

Operation

Let it be assumed that the car having the equipment shown in Fig. 1 is traveling under power with the brakes released and that the operator desires to apply the brakes to bring the car to a stop. To do so, the operator first shuts off the propulsion power and then operates the brake valve handle 17a to charge the straight-air pipe 15 to a pressure corresponding to the desired degree of brake application. Fluid under pressure is accordingly supplied through each branch pipe 15a control valve mechanism 19 and pipe 15b to the brake cylinders which accordingly operate to apply the brakes on the wheels to a degree corresponding to the pressure in the cylinders.

Upon the charging of the straight-air pipe 15 with fluid under pressure, the pressure operated switch 21 is operated to closed position, thereby conditioning the circuits of the magnet windings 48 of the control valve mechanisms 19 for energization in response to the operation of the corresponding rotary inertia operated devices 25. At the same time, fluid under pressure is supplied, in the manner previously described, to the pressure chamber 215 above the piston 193 of each rotary inertia device 25, thereby freeing the fly-wheel 112 thereof for rotative movement with respect to the spider 111 in response to the deceleration or acceleration of the car wheels.

As long as none of the wheels on the car slip, no change in the pressure of fluid under pressure in the brake cylinders 13 occurs except in response to variations in the fluid pressure in the straight-air pipe 15 for the reason that the control valve mechanisms 19 remain normally conditioned to permit fluid under pressure to be freely supplied to the brake cylinders and released from the brake cylinders in accordance with the variations of pressure in the straight-air pipe 15 as long as slipping of the wheels does not occur.

If the wheels of the wheel and axle assembly of one of the trucks, for example truck 12, begin to slip during an application of the brakes, the contact member 157 of the corresponding rotary inertia device 25 is actuated into firm contact with the contact cylinders 164 and 165, thereby completing the circuit for energizing the magnet winding 48 of the corresponding control valve mechanism 19.

The control valve mechanism 19 is accordingly operated, in the manner previously described, to effect venting of fluid under pressure from the brake cylinders of the corresponding truck at a rapid rate.

Due to the instantaneous and rapid reduction of the pressure in the brake cylinders on the truck having the slipping wheels, the slipping wheels promptly cease to decelerate and begin to accelerate back toward a speed corresponding to car speed. In such case, therefore, the fly-wheel 112 of the corresponding rotary inertia device 25 shifts from a leading to a lagging position with respect to the normal rotative position thereof relative to the spider member 111. The rate of rotative acceleration of the slipping wheels back toward a speed corresponding to car speed is of the same order of magnitude as the rate of deceleration during the slipping condition and, consequently, sufficient relative rotative movement of the fly-wheel 112 with respect to the spider 111 occurs during the acceleration of the slipping wheels back toward a speed corresponding to car speed to effect engagement of the contact member 157 with the contact cylinders 164 and 165.

The interval of time occurring during which the contact 157 is shifted laterally through its normal position in response to the change from deceleration to acceleration of the slipping wheels is so short that the inherent inductive lag in the operation of the magnet winding 48 prevents a change in the position of the double beat valve 45 during such interval of time. Consequently, the circuit for energizing the magnet winding 48 of the control valve mechanism is reestablished during the accelerating period of the slipping wheels and is maintained as long as the slipping wheels continue to accelerate at a sufficient rate, that is, at a rate exceeding ten miles per hour per second.

It will thus be seen that the vent valve section of the control valve mechanism 19 continues to remain operative to continue the reduction of the pressure in the brake cylinders 18 on the truck having the slipping wheels, once the slipping of the wheels begins until such time as the slipping wheels cease to accelerate at a rate exceeding ten miles per hour per second.

When the slipping wheels cease to accelerate at a rate exceeding ten miles per hour per second, which occurs at the time that the slipping wheels are approaching closely to a speed corresponding to car speed the contact 157 is restored to its normal position out of contact with the contact cylinders 164 and 165. The circuit for energizing the magnet winding 48 of the control valve mechanism 19 is thus interrupted. As previously explained, the vent valve section 27 of the control valve mechanism 19 is thus restored to its normal condition in which fluid under pressure is resupplied to the brake cylinders 18. Moreover, the reapplication control valve section 28 of the control valve mechanism 19 functions to restrict the rate at which the pressure in the brake cylinder builds-up to a rate determined by the size of the retricted choke 63 as previously explained until such time as the valve 58 is unseated in response to the substantial restoration of the pressure in the brake cylinders to a pressure corresponding to that established in the straight-air pipe 15 and effective in the chamber 56 above the diaphragm 57. Thereafter with the valve 58 unseated, fluid under pressure is rapidly supplied past the valve 58 to the brake cylinders wherein the pressure is ultimately built-up to a value corresponding to that in the straight-air pipe 15.

Fluid under pressure is resupplied at a restricted rate through the choke 63 of the reapplication control valve mechanism 28 of the control valve mechanism 19 to the brake cylinders 18 following wheel slip in order to prevent a too sudden reapplication of the brakes which might result in a recurrence of wheel slip and possibly actual wheel sliding.

If, however, recurrence of slipping of a given set of wheels does occur in response to the resupply of fluid under pressure to the corresponding brake cylinders, the rotary inertia operated device 25 again functions in the manner previously described to effect a second operation of the control valve mechanism 19. Operation of the control valve mechanism 19 may thus be effected repeatedly as many times as the wheels repeatedly begin to slip. At no time, therefore, during a brake application are the wheels permitted to decelerate in speed to a locked condition and slide.

When the car is brought to a complete stop as result of the brake application in the manner just described, the rotary inertia devices 25 are all retored to their normal condition as a result of the cessation of rotation of the shaft 82. Consequently, the magnet windings 48 of the control valve mechanism 19 are always deenergized in normal manner when the car is brought to a complete stop. Consequently, the control valve mechanisms 19 are always restored to the normal condition thereof permitting the charging of the brake cylinders with fluid at a pressure corresponding to that established in the straight-air pipe 15 while the car is stopped. The operator may accordingly increase the pressure in the straight-air pipe 15 and in the brake cylinders 18 to any desired degree, after the car is stopped, in order to hold the car against creepage on any degree of grade encountered in service.

When the operator again desires to start the car, he may do so by first restoring the brake valve handle 17a to its normal or brake release position and then applying propulsion power to the vehicle. Upon restoration of the brake valve handle 17a to its brake release position, fluid under pressure in the straight-air pipe 15 and consequently in the brake cylinders 18 is vented to atmosphere through the exhaust port 23 of the brake valve, thereby effecting the complete release of the brakes.

Upon the reduction of the pressure in the straight-air pipe 15 to atmospheric pressure, the pressure switch 21 is restored to its open position, thereby opening the circuits of the magnet windings 48 of the several control valve mechanisms 19 and preventing any undesired energization thereof, while the brakes are released, which might result in the drainage of energy from the storage battery 220.

Upon the reduction of the pressure in the straight-air pipe 15 to atmospheric pressure, the pressure of fluid in the chamber 215 of each of the rotary inertia devices 25 is correspondingly reduced to atmospheric pressure. The force compressing the springs 126 is thus removed and the springs are effective to urge the clutch disk 125 to a position clamping the fly-wheel 112 to the spider 111. The steel balls 143 and the cooperating conical recesses 144 in the fly-wheel thus function automatically to shift the flywheel 112 into its fixed normal position, if it is not in such position, with respect to the spider and lock it therein. Accordingly, the accidental and undesired displacement of the fly-wheel 112, in response to shock or jar occasioned by the travel of the car along the rails cannot occur and thus the undesired engagement of the switch contact 157 with the contact cylinders 164 and 165 is prevented. Wear on the switch contact member 157 as a result of undesired rubbing contact with the contact cylinders 164 and 165 while the brakes are released is thus prevented and consequently the life of the switch contact member and the contact cylinders 164 and 165 is indefinitely extended.

The construction and mounting arrangement of our improved rotary inertia device is such as to facilitate the installation and removal of the parts from the casing 71 for inspection or repair. Thus, by removing the screws 172, all of the parts attached to the cover member 171 may be removed as a unit, including the contact cylinders 164 and 165. Upon removal of the pinion 84 from shaft 82 through the opening 107 after first removing the cover plate 108, the entire remaining mechanism including the flywheel 112, spider 111 and shaft 82 may be lifted upwardly out of the casing 71 through the upper open end thereof. In order to facilitate the removal of the parts of the device from the casing 71, the pipe 217 connected to the cover member 171 is preferably of armored flexible conduit or piping so that it is unnecessary to disconnect the pipe 217 from the cover member 171 to inspect or repair the parts of the device. It will be apparent that if desired, an entirely new unit may be substituted for the unit removed, the driving pinion 84 resecured to the lower end of the shaft 82 and the cover plate 108 re-installed in a relatively few minutes. Thus, it is possible to reduce to a minimum the time that a car may be kept out of useful service. Moreover, inspection, servicing and repair of the parts may be done by relatively skilled persons.

It will also be seen that access to the driving wheel 87 may be had through the opening 103 for purposes of repair or replacement without removing the casing 71 or disturbing its connection to the journal casing 79. In view of the fact that removal of the casing 71 along with the disk 75 from the adapter ring 77 necessitates a draining of the oil from the journal casing 79, it will be seen that a saving of time is made possible by the arrangement which we have devised, it is unnecessary to remove casing 71 and thus to drain the oil from the journal casing.

Summary

Summarizing, it will be seen that we have disclosed a rotary inertia type of control device of novel construction whereby it may be mounted in direct association with a railway car axle, the manner of mounting the device being such as to permit installation and removal of the device for inspection, replacement or repair of parts in a relatively short time by relatively unskilled persons.

Essentially, the rotary inertia device comprises a fly-wheel or inertia ring arranged to be supported wholly on radially extending leaf springs anchored at the inner ends thereof to a spindle or shaft driven according to the rotational speed of a wheel axle through a speed-multiplication drive mechanism of the friction type.

A clutch mechanism is provided whereby to positively support the fly-wheel at all times when operation of the device is not required, such as while the brakes on the car are released, in order to remove the stresses on the supporting leaf springs due to the weight of the fly-wheel. The life of the device is thus extended and the necessity for repair or servicing of parts reduced.

The clutch mechanism for the fly-wheel is so constructed as to automatically position and lock the fly-wheel in a fixed normal rotative position with respect to the driving shaft thereof, in order to prevent undesired wear of switch contact members due to vibration or shock. The clutch mechanism is further so constructed and arranged that when the fly-wheel is freed for rotative movement with respect to the driving shaft, the vertical vibratory displacement of the fly-wheel is limited to a degree not exceeding the safe maximum stress limit of the leaf springs supporting the fly-wheel.

When employed in a brake control equipment for railway cars and trains, the clutch mechanism for providing a support for the fly-wheel additional to the leaf springs is arranged to be controlled by a fluid pressure operated device in such a manner that the fly-wheel is freed for operative movement only when the brakes are applied.

The basic principle of supporting a fly-wheel on radially disposed leaf springs is disclosed and claimed in the prior Patent 2,290,589 of A. A. Steinmiller and is also shown in the prior co-pending application Serial No. 433,758, filed March 7, 1942, now Patent No. 2,306,485, issued Dec. 29, 1943, of Joseph C. McCune, one of the present joint applicants. Such specific mounting arrangement of the fly-wheel is accordingly not broadly claimed herein.

Having now described our invention, what we claim as new and desire to secure by Letters Patent, is:

1. A rotary inertia device comprising a rotary member, a fly-wheel, means associating said fly-wheel and said rotary member in a manner to cause the fly-wheel to be driven according to the rotation of the rotary member and in such a manner that said fly-wheel shifts rotatively out of a certain position relative to said rotary member in accordance with the rate of change of speed of said member, control means operatively responsive to the rotational movement of the fly-wheel with respect to the rotary member, and means for locking said fly-wheel in its said certain position with respect to the rotary member to prevent the undesired operation of said control means.

2. A rotary inertia device comprising a rotary member, a fly-wheel, means associating said fly-wheel and said rotary member in a manner to cause the fly-wheel to be driven according to the rotation of the rotary member and in such a manner that said fly-wheel shifts rotatively out of a certain position relative to said rotary member in accordance with the rate of change of speed of said member, control means having a normal inactive position when the fly-wheel is in its said certain position relative to said rotary member and operative to an active position in response to a predetermined rotational movement of said fly-wheel out of said certain position with respect to the rotary member, and means for locking said fly-wheel in its said certain position with respect to the rotary member to prevent the undesired operation of the control means out of its inactive position.

3. A rotary inertia device comprising a rotary member, a fly-wheel, means associating said fly-wheel and said rotary member in a manner to cause the fly-wheel to be driven according to the rotation of the rotary member and in such a manner that said fly-wheel shifts rotatively out of a certain position relative to said rotary member in accordance with the rate of change of speed of said member, control means having a normal inactive position when the fly-wheel is in its said certain position relative to said rotary member and operative to an active position in response to a predetermined rotational movement of said fly-wheel out of said certain position with respect to the rotary member, and means effective at one time to permit the rotational movement of the fly-wheel with respect to the rotary member and effective at another time to automatically restore said fly-wheel to its said certain position with respect to the rotary member and lock it therein to prevent the undesired operation of the control means out of its inactive position.

4. A rotary inertia device comprising a rotary member, a fly-wheel, means providing connection between the fly-wheel and the rotary member and so constructed and arranged that the fly-wheel has a certain normal rotational position with respect to said rotary member and shifts out of said certain normal position in accordance with the rate of change of speed of the rotary member, a plurality of non-rotative annular contact members, a contact element disposed within said annular contact members and shiftable in opposite directions out of a normal centered position into engagement with said annular contact members, and means effective in the certain normal position of the fly-wheel with respect to the rotary member for centering said contact element within said annular contact members and out of contact therewith, said last means being operative in response to a predetermined degree of rotational movement of the fly-wheel in one direction out of its said certain position for effecting movement of the said contact element in one direction into simultaneous engagement with said plurality of annular contact members and in response to a predetermined degree of rotational movement of the fly-wheel in the opposite direction out of its certain position for effecting movement of said contact element in the opposite direction into simultaneous engagement with said plurality of annular contact members.

5. A rotary inertia device for detecting the rate of change of speed of a rotary element on which brakes may be applied and released, said device comprising a rotary member rotatable according to the rotational speed of the rotary element, a fly-wheel, means providing a driving connection between said fly-wheel and said rotary member so constructed and arranged that said fly-wheel has a certain normal position rotationally with respect to said rotary member and shifts out of said certain normal position in accordance with the rate of change of speed of the rotary member, a control means operatively responsive to rotational movement of the fly-wheel with respect to the rotary member, and means for preventing rotational movement of the fly-wheel with respect to the rotary member while the brakes are released from said rotary element.

6. A rotary inertia device for detecting the rate of change of speed of a rotary element on which brakes may be applied and released, said device comprising a shaft rotatable according to the rotational speed of the rotary element, a fly-wheel, resilient means so constructed and arranged as to support said fly-wheel in coaxial relation to said shaft and in such a manner that the fly-wheel has a certain normal rotational position with respect to the shaft and shifts rotationally with respect to the shaft in accordance with the rate of change of speed of the shaft, said resilient means permitting axial movement of said fly-wheel with respect to said shaft, control means operatively responsive to rotational movement of the fly-wheel with respect to the shaft, and means operative to prevent the rotational and axial movement of the fly-wheel with respect to the shaft while the brakes associated with said rotary element are released.

7. A rotary inertia device comprising a rotary member, a fly-wheel, resilient means connecting said fly-wheel to said rotary member and supporting the fly-wheel in substantially concentric relation to the rotary member, said fly-wheel having a certain normal position rotationally with respect to the rotary member and being shiftable rotationally out of said certain normal position in varying degree according to the rate of change of speed of the rotary member, a rigid member carried by the rotary member and cooperating with said fly-wheel in a manner to limit the undesired axial movement of the fly-wheel to an amount insufficient to exceed a certain safe stress in said resilient means, and clutch means including a clutch member carried by said rotary member and cooperating with said rigid member in such a manner as to rigidly immobilize said fly-wheel with respect to said rotary member.

8. A rotary inertia device comprising a rotary member, a fly-wheel, resilient means connecting said fly-wheel to said rotary member and supporting the fly-wheel in substantially concentric relation to the rotary member, said fly-wheel having a certain normal position rotationally with respect to the rotary member and being shiftable rotationally out of said certain normal position in varying degree according to the rate of change of speed of the rotary member, a rigid member carried by the rotary member and cooperating with said fly-wheel in a manner to limit the undesired axial movement of the fly-wheel to an amount insufficient to exceed a certain safe stress in said resilient means, clutch means including a clutch member carried by said rotary member and cooperating with said rigid member in such a manner as to rigidly immobilize said fly-wheel with respect to said rotary member, non-rotative fluid pressure responsive means, and bearing means interposed between said non-rotative fluid pressure responsive means and said clutch member in a manner to cause operative movement of said clutch member in response to operation of the fluid pressure responsive means while said rotary member is rotating.

9. A rotary inertia device comprising a rotary member, a fly-wheel, resilient means connecting said fly-wheel to said rotary member and supporting the fly-wheel in substantially concentric relation to the rotary member, said fly-wheel having a certain normal position rotationally with respect to the rotary member and being shiftable rotationally out of said certain normal position in varying degree according to the rate of change of speed of the rotary member, a rigid member carried by the rotary member and cooperating with said fly-wheel in a manner to limit the undesired axial movement of the fly-wheel to an amount insufficient to exceed a certain safe stress in said resilient means, clutch means including a clutch member carried by said rotary member and cooperating with said rigid member in such a manner as to rigidly immobilize said fly-wheel with respect to said rotary member, and ball-and-socket means, partly on said clutch member and partly on said fly-wheel, operative in response to clutching movement of said clutch member for automatically restoring said fly-wheel to its said certain normal position, if not already therein, at the same time that the clutch member operates to immobilize said fly-wheel with respect to said rotary member.

10. A rotary inertia device comprising a rotary shaft disposed for rotation on a vertical axis, an annular fly-wheel, a plurality of leaf-spring elements disposed radially with respect to said rotary member and edgewise in a vertical direction, the inner ends of said leaf-spring elements being secured to said rotary shaft and the outer ends thereof cooperating with said annular fly-wheel in a manner to support said fly-wheel in substantially concentric relation to said rotary shaft and in a certain normal rotational position with respect to said rotary shaft, said fly-wheel being shiftable rotationally out of said certain normal rotational position with respect to said rotary shaft to a degree varying according to the rate of change of speed of the rotary shaft, rigid means carried by said rotary shaft and cooperating with said annular fly-wheel in a manner to limit the axial displacement of the fly-wheel with respect to the rotary shaft to a degree insufficient to exceed the safe maximum edgewise bending strength of said leaf-spring elements, and clutch means including a clutch member carried by and cooperating with said rigid means in a manner to grip the fly-wheel and immobilize it against all movement with respect to said rotary shaft, and non-rotative actuating means cooperating with said clutch member in a manner to effect operative movement thereof while said rotary shaft is rotating.

JOSEPH C. McCUNE.
GEORGE K. NEWELL.

REFERENCES CITED

The following references are of record in the file of this patent:

UNITED STATES PATENTS

| Number | Name | Date |
|---|---|---|
| 2,290,589 | Steinmiller | July 21, 1942 |
| 2,290,588 | Grondahl | July 21, 1942 |
| 1,652,449 | Miller | Dec. 13, 1927 |
| 2,198,034 | Farmer | Apr. 23, 1940 |
| 2,146,463 | Bone | Feb. 7, 1939 |